Nov. 4, 1969    TAMEO TANAKA    3,476,952
APPARATUS FOR CONTROLLING THE ELECTRO-PARAMETRIC
OSCILLATION PHASE
Filed Dec. 11, 1963    4 Sheets-Sheet 1

INVENTOR.
Tameo Tanaka

BY

Western & Western

INVENTOR.
Tameo Tanaka
BY
Meskin & Meskin

*INVENTOR.*
Tameo Tanaka

BY

Mestern & Mestern

Nov. 4, 1969  TAMEO TANAKA  3,476,952
APPARATUS FOR CONTROLLING THE ELECTRO-PARAMETRIC
OSCILLATION PHASE
Filed Dec. 11, 1963  4 Sheets-Sheet 4

INVENTOR.
Tameo Tanaka
BY
Western & Western

United States Patent Office 3,476,952
Patented Nov. 4, 1969

3,476,952
APPARATUS FOR CONTROLLING THE ELECTRO-PARAMETRIC OSCILLATION PHASE
Tameo Tanaka, Kitakyushu-shi, Japan, assignor to Kabushiki Kaisha Yaskawa Denki Seisakusho, Kitakyushu-shi, Japan, a joint-stock company of Japan
Filed Dec. 11, 1963, Ser. No. 331,641
Claims priority, application Japan, Dec. 14, 1962, 37/55,212; Feb. 8, 1963, 38/6,631; Feb. 9, 1963, 38/6,765, 38/6,766, 38/6,767; May 4, 1963, 38/23,250; May 7, 1963, 38/24,479, 38/24,498; June 14, 1963, 38/31,808; July 3, 1963, 38/35,762; Sept. 21, 1963, 38/50,354
Int. Cl. H01f 27/42, 31/06
U.S. Cl. 307—88        23 Claims

ABSTRACT OF THE DISCLOSURE

An apparatus for the control of the oscillation phase of a first parametric oscillator being continuously excited without pulsive excitation, in which an electronic valve having a control transistor is connected in parallel to the tuning capacitor of said first parametric oscillator, said electronic valve being brought into the on or off state by a control signal having the same frequency as that of the parametric oscillation and having the same or reverse phase as that of the said parametric oscillation.

---

This invention relates to a method for the control of the phase of oscillation voltage in a parametric oscillator excited continuously.

Parametron operational circuits of known type require at least three parametron elements in order to memorize one phenomenon. In such a circuit system, an excited and oscillating parametron transmits a minute oscillation voltage, through a coupling impedance, to another parametron which is next to begin oscillation, this operation being accomplished in a circulatory manner by three parametrons. Furthermore, since for the parametrons the so-called "three-beat excitation" system is used, the operational speed is determined by a period of three beats. Accordingly, about one-fiftieth of the oscillation period of a parametron is considered to be practical as the operational speed.

A parametron operation circuit, which consists of semi-permanent circuit elements, has required three elements for memory, and the low operational speed unavoidably due to the three-beat oscillation has constituted the greatest disadvantage of such a circuit in comparison with the other types of electronic computers.

The present invention contemplates increasing the operational speed of parametron operation circiuts by inserting electronic valves such as transistors in the parametric oscillator and yet retaining the merits of the conventional method of three-beats excitation (facile amplification due to the use of A.C. voltage for the information signal, freedom from confusion by other noises, a high S–N ratio, long life of the elements, and low electric power consumption).

An object of this invention is to provide a method for obtaining a high-speed asynchronous logical operational element by controlling the phase of oscillation voltage in a continuously excited and oscillating parametric oscillator.

It is another object of this invention to reduce the number of operational elements, to achieve memory by means of one element, and to eliminate the keying operation needed for three-beat excitation because of its continuous excitation, whereby to simplify the apparatus, and to effect considerable reduction in electric power consumption.

This invention affords, therefore, the combination of the reliability of parametrons and an operational speed approximating that of operational circuits whose main elements are semiconductors. Accordingly, the invention provides the optimum method for operational mechanisms in electronic computers or for numerical control mechanisms in the automatic machine tools.

In the conventional parametron system, the memory circuit is composed of a number of groups of parametrons, each of these groups consisting of three parametrons, and these groups are suitably combined according to the desired memory circuit. In such a system, three-beat excitation is used to cause logical operation to take place in the transition to the succeeding beat, and because of the excitation build-up condition and of the state oscillation build-up, the shortest time needed for one beat is limited. These circumstances cause the low operational speed of the operational apparatus using parametron elements, and together with the recent improvement in quality of semiconductor elements, the use of parametron operational circuits appears to be declining.

In view of this circumstance, the present invention contemplates providing a method by which one parametron element is made to be adapted to constitute one memory operational circuit, a continuous excitation is made to be employed instead of the conventional three-beat excitation system wherein three groups of parametrons are successively excited through a parametric oscillation frequency keying operation, and electronic valves such as transistors are inserted in parallel in an oscillation circuit which is being continuously excited and is continuing parametric oscillation by means of various systems for applying A.C. signals for control (parametric oscillation voltage) to the control electrodes of the said electronic valves whereby the phase of oscillation voltage in oscillation circuit is made to be controlled at will to carry out various desired operations.

If, in a resonance circuit containing a reactance element of nonlinear type, parametric excitation is effected by the application thereto of an excitation alternating current having a frequency twice that of the resonance frequency of the said circuit, the said circuit will produce a so-called parametric oscillation at the resonance frequency. The phase of the oscillation voltage thus created takes the position of "0" radian or "π" radians, these phase positions differing from each other by 180° of electrical angle. One method of selecting either of these positions is to apply a minute control signal prior to the initial amplification period of the parametric oscillation and to control the oscillation phase by means of this signal. The states of these two phases of oscillation in the parametric oscillator will hereinafter be referred to by the designations "1" or "0." An operational element in which parametric oscillation is utilized accomplishes information treatment through the phase discrimination function of either "1" or "0."

This invention provides a method wherein, by means of an input signal for an electronic valve, the energy of a parametric oscillation in phase with the said signal (or of opposite phase) is caused to be dissipated, and a parametric oscillation of opposite phase is generated. For example, when the oscillation voltage in a parametric oscillator which has been caused by a continuous excitation is in phase with the control signal voltage (the selection of either the "1" or "0" state for this A.C. cycle is optional) of the same parametric oscillation applied to the base of an emitter-grounded transistor inserted in parallel in the said oscillator, the transistor mentioned above assumes a state in the active region and has the effect of shorting the oscillation circuit of the oscillator which is in tuning state. As a result, a parametric oscillation voltage with a phase opposite to that of the control signal voltage is generated. The control conditions of the electronic valve are suitably selected according to the type of the said valve.

The nature, principles, and details of the invention will be more clearly apparent by reference to the following detailed description of preferred embodiments of the invention when taken in conjunction with the accompanying drawings in which like parts are designated by like reference characters, and in which.

Figure 1:
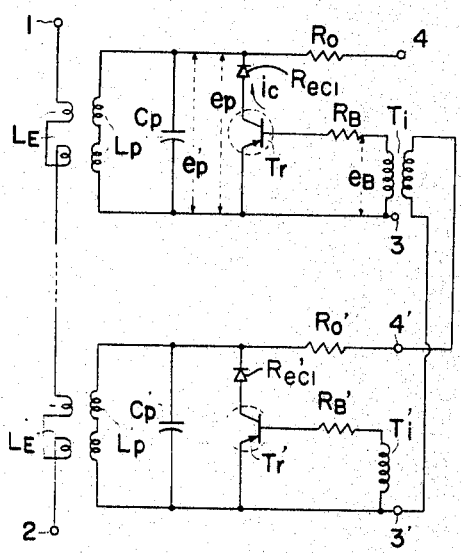
FIG. 1 and FIG. 3 are the circuit diagrams showing a first embodiment of the invention.

In the first embodiment of the invention as shown in FIG. 1, the circuit having terminals 1 and 2 is an excitation circuit with excitation windings $L_E$, $L'_E$, which excite resonance coils $L_p$ and $L'_p$ of circuits which further include tuning capacitors $C_p$ and $C'_p$, electronic valves $T_r$ and $T'_r$ consisting of semiconductor elements (with control electroles) such as transistors, non-inductive resistances $R_B$ and $R'_B$ of high resistance value, output adjusting resistances $R_o$ and $R'_o$, transformers $T_i$ and $T'_i$ for control signal voltage input, common terminals 3 and 3', rectifier elements $R_{ec1}$ and $R''_{ec1}$ such as silicon diodes which are connected so that when said transistors are in on states, a current can flow from their emitter side toward collector side, and output terminals 4 and 4'.

Figure 2:
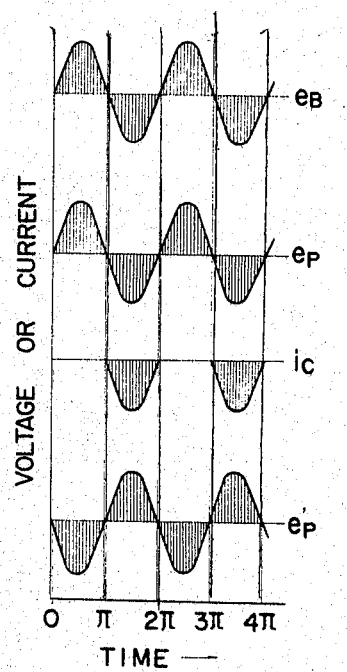
FIG. 2 is a graphical representation indicating waveforms of voltage and current.

In FIG. 2, voltage which is a control signal voltage of parametric alternating current and is applied to the base of each transistor, oscillation voltage of the parametric oscillator, and collector current of the transistor (approximately equal to the main circuit current) are, respectively, denoted by $e_B$, $e_p$ and $i_c$; and a parametric oscillation voltage with a phase which is different (opposite phase) from that of the voltage $e_B$ by $\pi$ radians is denoted by $e'_p$.

The control signal voltage $e_B$ is supplied through the output adjusting resistance $R'_o$ from the other parametric oscillator shown at the lower part of FIG. 1. It will be assumed that the circuit connections are so arranged that, in the secondary winding of input transformer $T_i$ (winding on the electronic valve side), the control signal voltage $e_B$ is in phase with the voltages generated at the terminals of the tuning capacitor $C'_p$ in the parametric oscillator ($L'_p$, $C'_p$). If the voltage $e_B$ of the secondary winding of the input transformer $T_i$ (control signal voltage) is of the same phase as the oscillation voltage $e_p$ of the tuning capacitor $C_p$ in the parametric oscillator ($L_p$, $C_p$) to be controlled, the control signal voltage $e_B$ being negative in the negative ½ cycle of the oscillation voltage $e_p$, the transistor $T_r$ of the parametric oscillator controlled will be in the state of its active region, a collector current $i_c$ will flow, and a loss will be caused. When the oscillation voltage $e_p$ and the control signal voltage $e_B$ are in their positive ½ cycle, the transistor $T_r$ is in the state of its inactive region. However, in this case, if the oscillation voltage $e_p$ and the control signal voltage $e_B$ are very low, a current flows through the diode between the collector and the base into the secondary winding of the input transformer $T_i$. However, if the resistance $R_B$ connected in series to the base of the transistor $T_r$ is sufficiently large, and the low current in the inactive region is negligible, the oscillation of the resonance winding $L_p$ and of the tuning capacitor $C_p$ in the parametric oscillator being controlled causes a loss at each ½ cycle wherein the emitter of the transistor $T_r$ is positive and the collector is negative, whereby this oscillation is damped. When the oscillation voltage $e_p$ and the control signal voltage $e_B$ are of mutually opposite phase, $e_B$ is positive in the negative ½ cycle of $e_p$, and, therefore, current does not flow in the collector of the transistor $T_r$. When the oscillation voltage $e_p$ is positive, the transistor $T_r$ is in the state of its inactive region. Consequently, a collector current does not flow even if the control input voltage is negative. However, a current flows through the diode element between the collector and the base. However, if the said current is limited by means of a resistance $R_B$ of high value connected in series to the base so as not to affect the oscillations of the resonance winding $L_p$ and of the tuning capacitor $C_p$, the oscillation in this case will continue without being damped. That is, when the control signal voltage $e_B$ is in phase with the oscillation voltage $e_p$, a collector current $i_c$ flows, while in case when the oscillation voltage $e'_p$ is of opposite phase, the said collector current does not flow. FIG. 2 graphically represents this phenomenon by the waveforms of voltages and currents.

Figure 4:
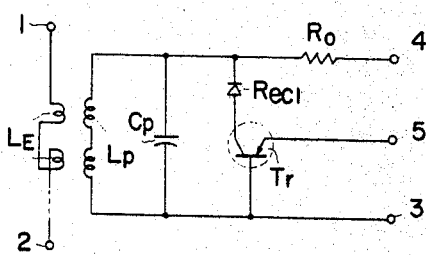
FIG. 4 and FIG. 5 are circuit diagrams, showing circuits in which the connections of the transistors in FIG. 1 are modified, and the unilateral rectifier elements are inserted in series in the forward direction of the main circuit current of the transistors.
Figure 3:
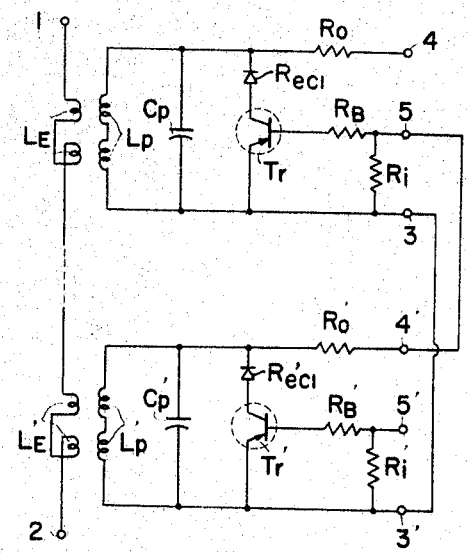
Figure 5:
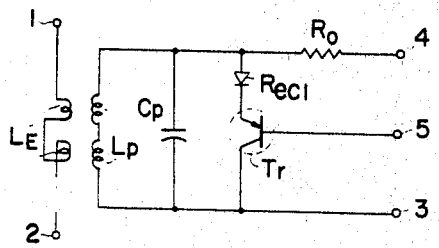

In the circuit shown in FIG. 3, the controlling and controlled parametric oscillators are connected through impedances $R'_o$ $R_i$ and $R_B$ in place of the transformers $T_i$, $T'_i$ for control signal voltage input. In this circuit, the terminals 5 and 5' are terminals for control signal input. FIG. 4 shows a circuit in which the emitter-grounding of the transistor $T_r$ used as the electronic valve in the circuit shown in FIG. 1 is replaced by a base-grounding, a rectifier element $R_{ec1}$ (for example, a silicon diode) is inserted in the forward direction of the transistor main circuit current from the base through the collector, the input impedance of the control signal voltage is matched at a smaller value than that in the case of emitter-grounding, and, moreover, the electronic valve circuit is rendered unilateral. FIG. 5 shows a circuit in which the transistor $T_r$ used as the electronic valve is of the collector-grounded type. This arrangement accordingly permits matching of the input impedance for the control signal voltage at a larger value in comparison with that in the case of emitter-grounding.

Figure 6:
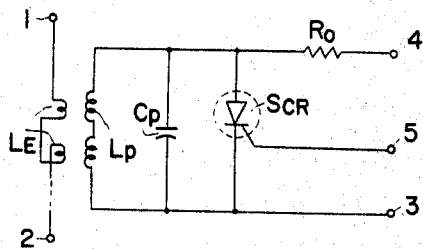
FIG. 6 is a circuit diagram showing a circuit in which an electronic valve such as silicon controlled rectifier (S.C.R.) is used in place of a transistor.

FIG. 6 shows a circuit in which a silicon controlled rectifier $S_{CR}$ is inserted as an electronic valve in parallel in the parametric oscillator, in place of the transistor, the control gate of the $S_{CR}$ being connected to the control input terminal 5. Since the ignition of the $S_{CR}$ takes place when the parametric A.C. control signal voltage, supplied to the gate through the terminal 5, is positive for positive potential of the anode of $S_{CR}$, the oscillation voltage of this phase is controlled so as to create a parametric oscillation of a voltage phase which is opposite to that of the control signal voltage.

Figure 7:
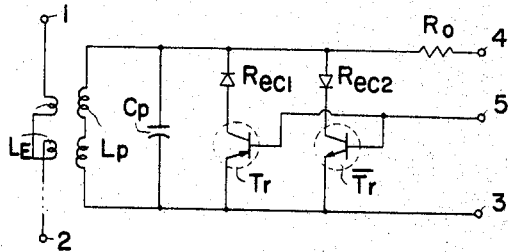
FIG. 7 through FIG. 9 are circuit diagrams of circuits in which a plurality of electronic valves are so connected that the respective directions of their main circuit currents are mutually opposite.

FIG. 7 shows a circuit in which unilateral rectifier elements $R_{ec1}$ and $R_{ec2}$ are inserted in reverse-parallel with a transistor $T_r$ and a transistor $\overline{T_r}$ of opposite phase in the directions of their respective transistor main circuit currents, and, furthermore, the transistor-bases functioning as control electrodes are connected commonly to the input terminal 5. In this system, when the oscillation voltage phase of the parametric oscillator ($L_p$, $C_p$) is in the same phase as that of the control signal, the collector current $i_c$ flows alternately in either of the transistors $T_r$ or $\overline{T_r}$ irrespective of whether the oscillation voltage $e_p$ is positive or negative the said current $i_c$ being conducted through the transistor $T_r$ or transistor $\overline{T_r}$ depending on whether the potential of the terminal 5 is negative or positive. Accordingly, it is apparent that in this case the control speed is doubled.

Figure 8:
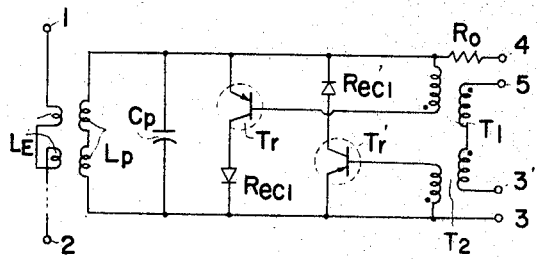

FIG. 8 shows a circuit in which an A.C. signal input enters through a terminal 5, is divided into different circuits through transformers $T_1$ and $T_2$, and finally is applied as a control signal to the corresponding transistor-bases. Since the primary sides of the transformers $T_1$ and $T_2$ are looped, and the phase of the control signal voltage is subject to inversion, when the phase of the oscillation voltage in the parametric oscillator ($L_p$, $C_p$) is opposite to that of the control signal voltage (through the transistor $T_r$ for negative potential of the terminal 5 and through the transistor $T'_r$ for positive potential of the same terminal), the parametric oscillation voltage is subjected to a rapid damping. Accordingly, the phase of the parametric oscillation voltage from the output terminal 4 is the same as that of the parametric A.C. voltage which is applied as a control signal to the input terminal 5. The terminal 3' is a retrace terminal for the control signal voltage.

Figure 9:
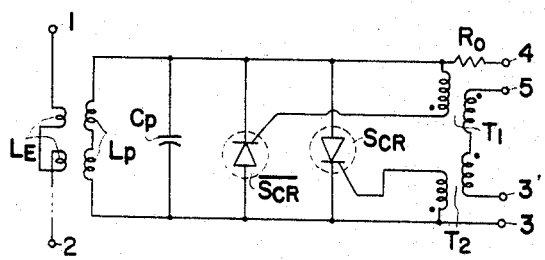

FIG. 9 shows a circuit in which two silicon controlled rectifiers $S_{CR}$ used as electronic valves are connected in reversible direction in place of the transistors of the circuit shown in FIG. 8. The operational effect of this circuit is the same as that of the circuit shown in FIG. 8.

Figure 10:
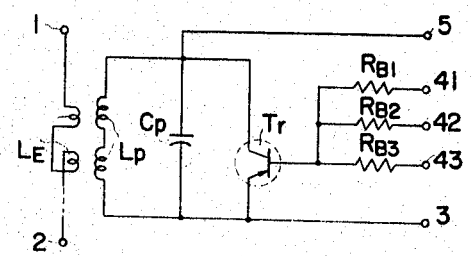
FIG. 10 through FIG. 12 are circuit diagrams of circuits in which control signal inputs into the control electrodes of electronic valves are subjected to majority operation, and parametric oscillation voltages of mutually opposite phase are produced as output through phase inverter transformers.

FIG. 10 shows a circuit in which the control signal voltages supplied to the electronic valve transistor $T_r$ is subjected to majority operation, the terminals 41, 42, and 43 being input terminals, the resistances $R_{B1}$, $R_{B2}$, and $R_{B3}$ being the corresponding base-resistances which are connected in parallel with one another and commonly to the transistor-base. It is to be observed that, in this system, it is necessary merely to increase the number of input terminals to correspond to the number of inputs of control signals.

Figure 11:
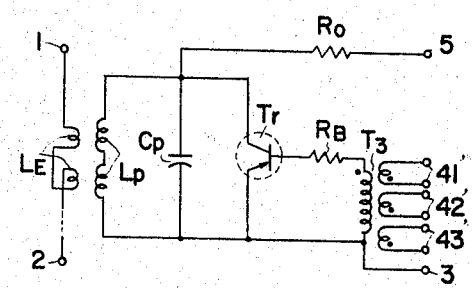

FIG. 11 shows a circuit in which majority operation of control signals in a multiple input system takes place through an input transformer $T_3$, the operational effect of this arrangement being the same as that of the circuit shown in FIG. 10.

Figure 12:
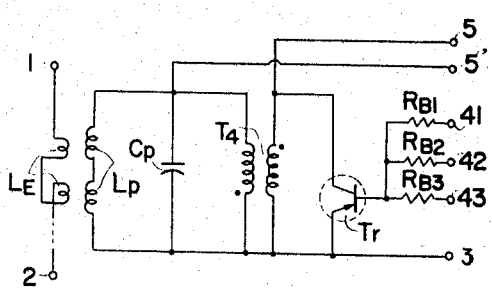

FIG. 12 shows a circuit in which a voltage phase inversion transformer $T_4$ is employed between the parametric oscillator ($L_p$, $C_p$) and the electronic valve transistor $T_r$ inserted in parallel with the said oscillator. In this system, a parametric oscillation voltage opposite in phase to the voltage phase of the control signal is produced from the output terminal 5, while that of the same phase is produced from the other output terminal 5'.

Figure 13:
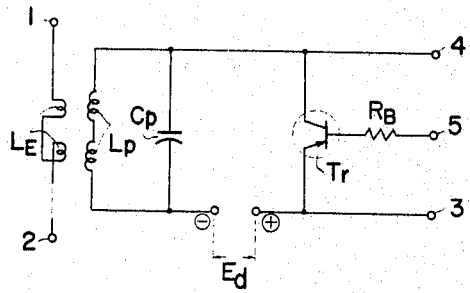
FIG. 13 through FIG. 15 are circuit diagrams of circuits in which D.C. voltage is biassed in series with the electronic valves and in the forward directions of the main circuits of the said valves.

FIG. 13 shows a circuit in which a D.C. current is applied in the direction of the transistor current in the circuit of the transistor $T_r$ shown in FIG. 1. In a circuit such as that shown in FIG. 1, when the saturation voltage of the collector of the transistor $T_r$ is at a high level, even if the transistor $T_r$ is in the state of its inactive region, the damping of the oscillation voltage due to the current of the main circuit of the transistor main is occasionally found to be insufficient; or else, since a current flows by way of the base owing to a barrier potential difference between the emitter and the base, a sufficient base-current to create a sufficient collector-current cannot be obtained when the control signal voltage is low. Consequently, a method as indicated in FIG. 13 is presented as a solution of the unsuitable conditions mentioned above. In this system, by obtaining a D.C. voltage $E_d$ having a polarity as indicated in the drawing and by causing the value of the said voltage to be equal to the saturation voltage of the transistor $T_r$, the collector current becomes zero when the oscillation voltage is zero, and inversion of phase of the oscillation voltage through some error when the voltage of oscillation is low and continuation of oscillation with inverted phase is prevented. In addition, by impressing D.C. current $E_d$ higher than the collector saturation voltage, the control speed for the phase of oscillation voltage can be increased by increasing the collector current.

Figure 14:
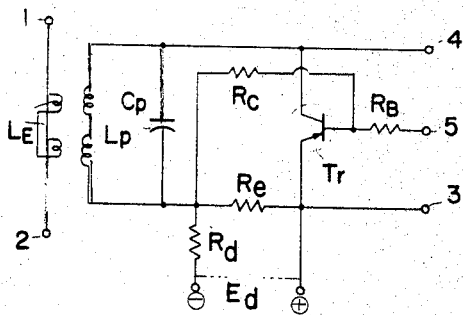

FIG. 14 shows a circuit in which, the control speed for the phase of oscillation voltage in the electronic valve transistor $T_r$ is increased, not by inserting directly in series a D.C. power source between the parametric oscillator ($L_p$, $C_p$) and the electronic valve transistor $T_r$, but by causing a D.C. current to flows through resistances $R_e$ and $R_d$ and utilizing the voltage drop of the resistance $R_e$. The resistance $R_c$ decreases the effect of barrier potential difference between the emitter and the base, and at the same time it accomplishes feed-back of a voltage to between the emitter and base of the transistor $T_r$ therethrough, thereby to compensate variation of the characteristic of the transistor due to temperature variation.

Figure 15:
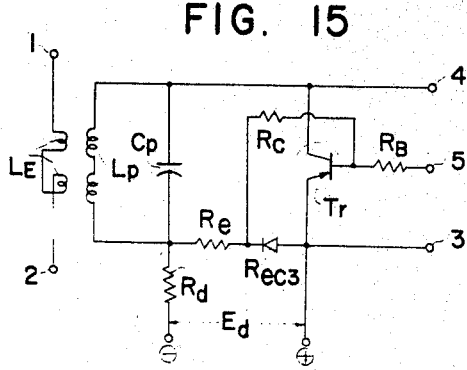

FIG. 15 shows a circuit in which the temperature compensation for the transistor $T_r$ is further improved. In this embodiment, a rectifier element $R_{ec3}$ is inserted in series in the circuit of the resistance $R_c$, whereby variation of the emitter-base characteristic of the transistor due to temperature variation, that is, variation of control characteristic due to temperature variation can be compensated for by variation of the characteristic of the rectifier element $R_{ec3}$ due to temperature variation. Since the collector current is affected by the base current rather than the collector saturation voltage, it is clear that this system of compensating the base current in accordance with the temperature variation is the most suitable, and the resistance $R_e$ may be omitted, if necessary.

Figure 16:
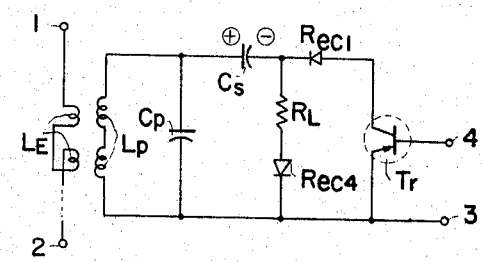
FIG. 16 is a circuit diagram of a circuit in which are inserted a capacitor and a two-terminal network consisting of a rectifier and a resistance, respectively connected in series and in parallel with the electronic valve.

FIG. 16 shows a circuit in which a capacitor $C_s$ and a rectifier element $R_{ec4}$ are connected, respectively in series and in parallel to the transistor $T_r$. If the transistor $T_r$ is not supplied with a voltage higher, in absolute value, than the collector saturation voltage, the collector current will not flow, and the flowing current will be limited by the internal resistance of the transistor. Consequently, there are cases in which when the oscillation voltage of the oscillator ($L_p$, $C_p$) is low, a sufficient collector current to damp the oscillation of a specified phase cannot be supplied with respect to the control signal. In such a case, the current flowing through the resistance $R_L$ and the rectifier element $R_{ec4}$ charges the capacitor $C_s$ with a polarity as indicated in FIG. 16. Moreover, if the current flowing from the emitter of the transistor $T_r$ through the collector is limited so as to keep approximately constant the charging state of the capacitor $C_s$ in the period when, because of the main circuit current flowing through the transistor $T_r$, the oscillation of the same voltage phase as the control voltage phase is interrupted and oscillation of opposite voltage phase takes place, the voltage of the capacitor $C_s$ charged through the resistance $R_L$ and the rectifier element $R_{ec2}$ will become equal to the peak value of this parametric oscillation voltage. This leads to an improvement of the control characteristic for oscillation voltage phase in the electronic valve transistor $T_r$ similarly as in the case illustrated in FIG. 13.

Figure 17:
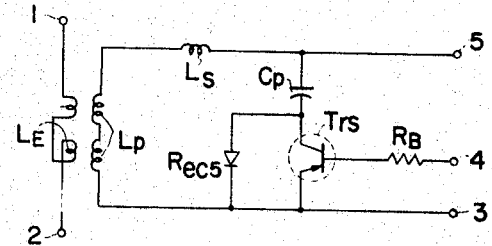
FIG. 17 and FIG. 18 are circuit diagrams of circuits in each of which the electronic valve is inserted in series with the tuning capacitor of a parametric oscillator.

FIG. 17 shows a circuit in which an electronic valve transistor $T_{rs}$ is inserted in series with the oscillation elements (inductance $L_p$ and capacitor $C_p$) of the parametric oscillator, and a unilateral rectifier element $R_{ec5}$ is connected as a by-pass in reverse direction to that of the main circuit current of the transistor $T_{rs}$. Furthermore, the oscillation conditions are improved by controlling the oscillation voltage by providing the circuit with a suitable value of Q ($Q=\omega L/R_{eff}$, where: $\omega=2\pi f$; $f$ is frequency; L is coil inductance; $R_{eff}$ is the effective resistance of the circuit) in accordance with the resistance value of the oscillation circuit of the parametric oscillator ($L_p$, $C_p$). While the oscillation voltage of phase corresponding to the active region of the electronic valve transistor $T_r$ in FIG. 1 is damped and dissipated in this system shown in FIG. 17, the parametric oscillation voltage of phase corresponding to the active region of the electronic valve transistor $T_{rs}$ is generated. For example, when the control signal voltage applied to the input terminal 4 is at a lower potential than the base or emitter of the transistor $T_{rs}$, and when the oscillation voltage of the continuously excited parametric oscillator is in phase with the control signal voltage, the main circuit current to pass from the emitter to the collector of the electronic valve transistor flows. When the potential difference in the succeeding half cycle of the oscillation voltage of this phase becomes reversed with respect to the transistor $T_{rs}$, the input voltage also becomes a positive cycle, and the transistor $T_{rs}$ does not pass any current, but the path through the by-pass rectifier $R_{ec5}$ becomes conductive. If the phases of the control signal voltage and of the oscillation voltage are mutually opposite, the transistor $T_{rs}$ will always be inactive, and a half-wave flows through the by-pass rectifier $R_{ec5}$, but without being capable of continuing the oscillation. The method described above is another way to control the phase of the parametric oscillation voltage by utilization of the phase of the control signal (parametric A.C.) current.

Figure 18:
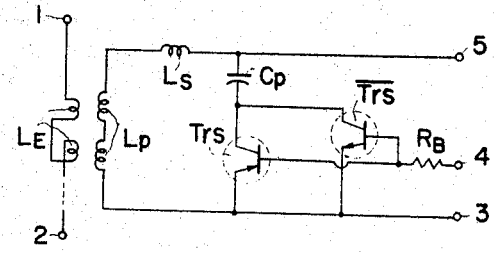

FIG. 18 shows a circuit in which the rectifier element $R_{ec5}$ for by-pass in FIG. 17 is replaced by a transistor $\overline{T}_{rs}$ of opposite phase with respect to the transistor $T_{rs}$, and the bases of these transistors, said bases being control input terminals, are connected in common.

Figure 19:
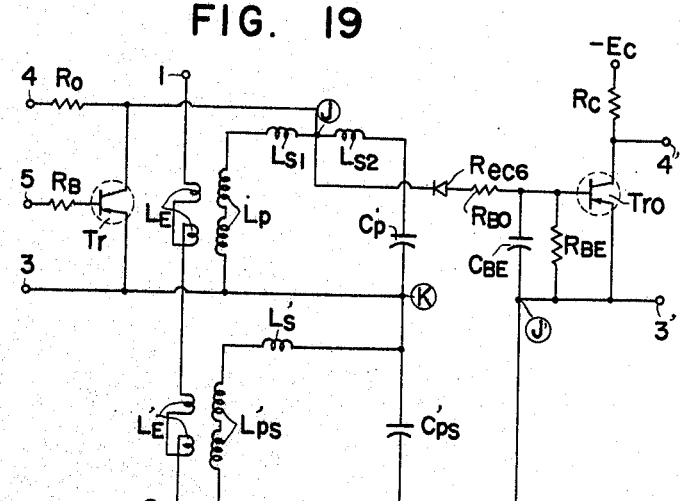
FIG. 19 is a circuit diagram showing a circuit in which the impedance matching of the input and output circuits of control signals is accomplished by means of a plurality of parametric oscillators.

FIG. 19 shows a parametric oscillation circuit in which the matching of impedances at the control signal input circuit or output circuit is rendered free to a certain degree. The windings $L'_{ps}$ and $L'_s$ and the capacitor $C'_{ps}$ constitute a fixed oscillation circuit, inductance $L'_s$ being provided with a suitable Q as described hereinbefore in connection with FIG. 16. The oscillation circuit of the parametric oscillator comprising a winding $L_p$ and a capacitor is provided with additional inductances $L_{p1}$ and $L_{p2}$ having suitable Q and connected in series therewith. According to the connection of FIG. 19, difference between the oscillation voltage at the junctions J and K and the voltage at the terminals of the capacitor $C'_{ps}$ appears between the junctions J and J' and is applied to the base of the output electronic valve transistor $T_{ro}$ through a rectifier element $R_{ec6}$, resistances $R_{bo}$ and $R_{be}$, and a capacitor $C_{be}$. Thus, when the phase of the oscillation voltage in the parametric oscillator ($L_p$, $C_p$) is the same as that of the parametric constant oscillator ($L'_{ps}$, $C'_{ps}$), the valve of the output electronic valve transistor $T_{ro}$ is opened. As a result, a current flows in the circuit from the resistance $R_c$ to the D.C. negative voltage $-E_c$, whereby it is possible to obtain an output D.C. voltage as the corresponding collector voltage. This system is convenient for compensating for the variations of inductances due to the variations of D.C. and A.C. components overlapped in the oscillation circuit from 1 to 2, by means of the inductances $L_{s1}$, $L_{s2}$, $L'_s$, etc. inserted in series in the parametric oscillator, and also for suitably selecting suitable matching of impedances with respect to the control signal input circuit of the output circuit.

Figure 20:
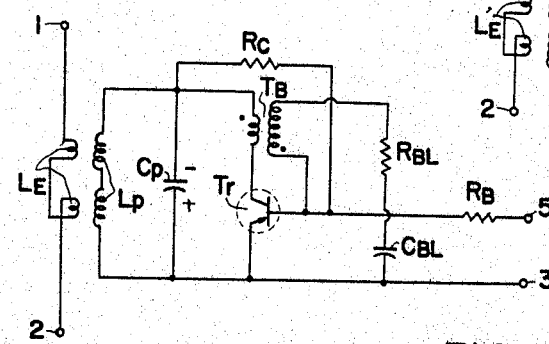
FIG. 20 and FIG. 21 are respectively a circuit diagram including a blocking oscillator and a graphical representation indicating the operation of the circuit shown in FIG. 20.
Figure 21:
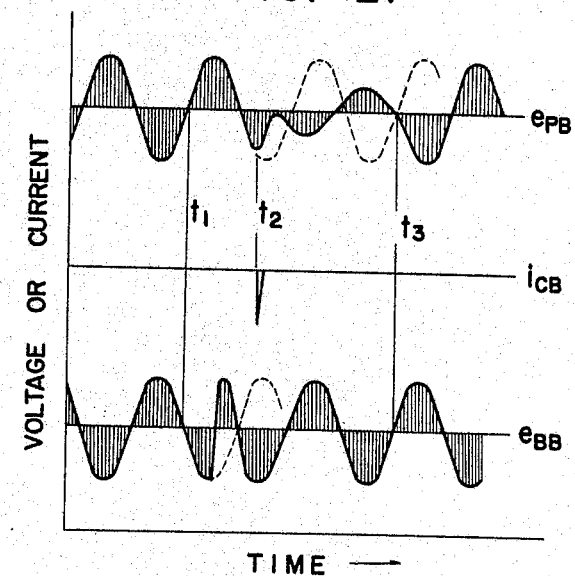

FIG. 20 shows a circuit in which a blocking oscillation circuit is added to the fundamental circuit shown in FIG. 1. The function of this circuit of FIG. 20 is shown by the waveform diagrams of voltage or current shown in FIG. 21. A transformer $T_B$ is coupled by a mutual inductance and a blocking oscillator is constituted by a resistance $R_{BL}$, a capacitor $C_{BL}$, and an electronic valve transistor $T_r$. A resistance $R_c$ compensates for the barrier potential difference between the resistance $R_c$ and the base of a transistor $T_r$, and a resistance $R_B$ is a base resistance of high value, as above described. The conditions under which the electronic valve transistor $T_r$ in the circuit of FIG. 20 is opened are that the condenser $C_p$ be in a negative ½ cycle of the parametric oscillation voltage the points J and K of which are respectively negative positive polarity as shown in the figure, and that the voltage applied to the base of the transistor $T_r$ from control signal input terminal 5 be of negative potential with respect to the retrace line 3. Under these two conditions, the blocking oscillator operates rapidly when the negative control signal reaches a certain value, a collector current flows in the transistor $T_r$, and the point J in the capacitor $C_p$ is charged with positive voltage, i.e., contrarily to that indicated in FIG. 20. Accordingly, by appropriately selecting the power of the blocking oscillator, and by means of one pulse of the blocking oscillator voltage corresponding to the negative cycle of the capacitor $C_p$, it is possible to control the oscillation voltage of the capacitor $C_p$ and the control signal voltage to be of opposite phase. The results of experiments according to this method is indicated by the waveform diagrams of voltage or current shown in FIG. 21, wherein the oscillation voltage of the parametric oscillator ($L_p$, $C_p$) is denoted by $e_{PB}$, the control signal voltage applied to the terminals 5 and 3 by $e_{BB}$. When a control signal is applied at a time $t_1$, then at a time $t_2$ a collector current $i_{CB}$ flows, and at a time $t_3$ the phase of oscillation voltage of the parametric oscillation voltage $e_{PB}$ is controlled to be the phase opposite that which existed before the said time $t_1$. The dotted line curves indicate the case without control, and the inversion of phases is quite obvious.

It is to be observed from the foregoing disclosure that, by the free control of phase of oscillation voltages in the continuously excited parametric oscillator according to the present invention, the operation takes place with discrimination of phases. Therefore, high-speed operations at speeds which are more than ten times those of the conventional "three-beats" excitation system can be obtained. Moreover, by the practice of the present invention, the power source equipment is substantially simplified.

It should be understood, of course, that the foregoing disclosure relates to only preferred embodiments of the invention and that it is intended to cover all changes and modifications of the examples of the invention herein chosen for the purposes of disclosure, which do not constitute departures from the spirit and scope of the invention.

What is claimed is:

1. An apparatus for the control of the oscillation phase of a first parametric oscillator being continuously excited, which comprises a grounded-emitter transistor the emitter and collector of which are connected in parallel to the resonance circuit of said first oscillator, a high value resistor connected in series to the base of said transistor, a second parametric oscillator connected to said first parametric oscillator through a transformer for applying a control signal voltage to the base of said first transistor thereby causing an oscillation of a phase opposite to that of said first oscillator.

2. An apparatus according to claim 1, wherein the transformer for applying the voltage of the second parametric oscillator to the base of the first transistor is replaced by a coupling resistor.

3. An apparatus according to claim 1, wherein the grounded-emitter transistor is replaced by a grounded-base transistor the base and collector of which are connected in parallel to the resonance circuit of the first parametric oscillator, and a rectifier element adapted to flow collector current is inserted on the collector side of said transistor.

4. An apparatus according to claim 1, wherein the grounded-emitter transistor is replaced by a grounded-collector transistor the emitter and collector of which are connected in parallel to the resonance circuit of the first parametric oscillator and a rectifier element adapted to flow emitter current is inserted on the emitter side of said transistor.

5. An apparatus according to claim 1, wherein the grounded-emitter transistor is replaced by a semiconductor rectifier having anode and cathode connected in parallel to the resonance circuit of the first parametric oscillator, and having a control electrode which is connected to the control input terminal.

6. An apparatus according to claim 1, wherein to the grounded-emitter transistor of the first parametric oscillator is connected in parallel another grounded-emitter transistor of opposite phase and rectifier elements adapted to flow their respective transistor main circuit currents are connected in series, respectively, to said transistors, bases of said transistors being connected commonly to the input control terminal.

7. An apparatus according to claim 1, wherein to the grounded-emitter transistor of the first parametric oscillator is connected in parallel a grounded-collector transistor, rectifier elements adapted to flow their respective transistor main circuit currents are connected in series, respectively, to said transistors, and an input transformer for control signal is connected to base circuit of each of said transistors, said input transformers being connected to apply control signals of inverse phase to the base circuits of said transistors, respectively.

8. An apparatus according to claim 5, wherein to the semiconductor rectifier is connected in parallel another semiconductor rectifier of reverse direction and an input transformer for control signal is connected to control electrode circuit of each of said semiconductor rectifiers, said input transformers being connected to apply control signals of inverse phase to the control electrode circuits of said semiconductor rectifiers, respectively.

9. An apparatus according to claim 1, wherein the control signal transformer is replaced by a resistance member comprising a plurality of parallelly connected resistors which are commonly connected to the base circuit of the transistor connected in parallel with the first parametric oscillator, free ends of said resistors being made as input terminals corresponding to control signals, thereby to cause majority operation of the control signals.

10. An apparatus according to claim 1, wherein the control signal transfer is replaced by a transformer the primary winding of which is composed of a plurality of coils to which a plurality of control signals are impressed respectively, thereby to cause majority operation of the control signals.

11. An apparatus according to claim 9, wherein a phase inversion transformer is interposed between the resonance circuit of the first parametric oscillator and the transistor.

12. An apparatus according to claim 1, wherein a direct current voltage source for applying a direct current voltage to the transistor circuit as a bias in the direction of the main circuit current of the transistor is directly connected in the resonance circuit of the first parametric oscillator.

13. An apparatus according to claim 12, wherein the direct current voltage source is impressed to a resistor inserted in the resonance circuit of the first parametric oscillator, voltage drop of said resistor being utilized as a bias in the direction of the main circuit current of the transistor.

14. An apparatus according to claim 13, wherein there is provided a resistance circuit for feeding back a voltage to between the emitter and base of the transistor.

15. An apparatus according to claim 13, wherein there is provided a rectifier element connected between the emitter and base of the transistor connected in parallel to the resonance circuit of the first parametric oscillator, thereby to compensate the variation of characteristic of the base current of said transistor due to temperature variation.

16. An apparatus according to claim 14, wherein a rectifier element is connected between the emitter and base of the transistor connected in parallel to the resonance circuit of the first parametric oscillator.

17. An apparatus according to claim 1, wherein a network, which comprises a capacitor and a resistor connected respectively in series and in parallel to the transistor and a rectifier element connected in the direction reverse to that of the transistor main circuit current, is provided.

18. An apparatus according to claim 1, wherein a rectifier element is connected in series to the tuning capacitor of the resonance circuit of the first parametric oscillator, said rectifier element being connected in parallel to the transistor in the direction reverse to that of the main circuit current of said transistor.

19. An apparatus according to claim 18, wherein the value of Q of the resonance circuit of the first parametric oscillator is suitably selected.

20. An apparatus according to claim 18, wherein the rectifier element connected in series to the tuning capacitor of the resonance circuit of the first parametric oscillator is replaced by another transistor of opposite phase with respect to the main transistor, bases of said transistors being connected to control input terminals in common.

21. An apparatus according to claim 19, wherein the rectifier element connected in series to the tuning capacitor of the resonance circuit of the first parametric oscillator is replaced by another transistor of opposite phase with respect to the main transistor, bases of said transistors being connected to control input terminals in common.

22. An apparatus according to claim 1, which additionally comprises at least one inductance coil ($L_{s1}$, $L_{s2}$) provided in the first parametric oscillator ($L_p$, $C_p$) besides its oscillation coils; an oscillation circuit comprising oscillation coils ($L'_{ps}$), a capacitor ($C'_{ps}$) and at least one inductance coil ($L'_s$), said oscillation circuit being connected with said parametric oscillator so that the terminal voltage of said capacitor ($C'_{ps}$) is superimposed differentially to the output voltage of said parametric oscillator; an output transistor ($T_{ro}$) the base circuit of which connected to said differentially superimposed voltage through an impedance consisting of a rectifier element, a capacitor and resistors, whereby said output transistor is made to open when the oscillation voltage of said parametric oscillator is in phase with that of said oscillation circuit.

23. An apparatus according to claim 1, wherein the first parametric oscillator is additionally provided with a blocking oscillation circuit consisting of a transformer primary and secondary coils of which are respectively connected in parallel to base-emitter circuit of the transistor connected in parallel to the resonance circuit of the parametric oscillator and in series with the collector circuit of said transistor, a resistor and a capacitor connected in series with said primary coil, and said transistor.

References Cited

UNITED STATES PATENTS 3,398,293   8/1968   Tanaka _____ 307—88

JAMES W. MOFFITT, Primary Examiner

U.S. Cl. X.R.

331—165